(12) United States Patent
Afrasiabi

(10) Patent No.: US 11,886,644 B2
(45) Date of Patent: Jan. 30, 2024

(54) HUMAN MACHINE INTERFACE AND ASSOCIATED METHOD OF INTERACTION

(71) Applicant: THE BOEING COMPANY, Chicago, IL (US)

(72) Inventor: Amir Afrasiabi, University Place, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 17/550,213

(22) Filed: Dec. 14, 2021

(65) Prior Publication Data

US 2022/0187923 A1 Jun. 16, 2022

Related U.S. Application Data

(60) Provisional application No. 63/125,146, filed on Dec. 14, 2020.

(51) Int. Cl.
*G06F 3/01* (2006.01)
*G06V 40/16* (2022.01)

(52) U.S. Cl.
CPC .............. *G06F 3/017* (2013.01); *G06F 3/012* (2013.01); *G06V 40/161* (2022.01)

(58) Field of Classification Search
CPC ........ G06F 3/017; G06F 3/012; G06V 40/161
See application file for complete search history.

(56) References Cited

U.S. PATENT DOCUMENTS

| | | | | |
|---|---|---|---|---|
| 6,039,254 A | * | 3/2000 | Froese-Peeck | G06K 7/10732 |
| | | | | 235/462.32 |
| 2014/0059673 A1 | * | 2/2014 | Azar | H04N 7/18 |
| | | | | 726/19 |
| 2016/0210518 A1 | * | 7/2016 | Script | G08B 13/19665 |
| 2019/0073043 A1 | | 3/2019 | Schalla et al. | |
| 2019/0213309 A1 | * | 7/2019 | Morestin | G01S 17/04 |

(Continued)

FOREIGN PATENT DOCUMENTS

| | | |
|---|---|---|
| CN | 111 325 129 A | 6/2020 |
| JP | 2022086086 A * | 6/2022 |

OTHER PUBLICATIONS

EP Application No. 21213689.9, Extended European Search Report dated Apr. 14, 2022.

*Primary Examiner* — Chanh D Nguyen
*Assistant Examiner* — Ngan T. Pham-Lu
(74) *Attorney, Agent, or Firm* — ALSTON & BIRD LLP

(57) ABSTRACT

A human machine interface (HMI), a method of interacting with an HMI and a corresponding computer program product facilitate user interaction with an HMI. In a method, a face of a person attempting to interact with the HMI is detected and a gesture made by the person relative to the HMI is also detected. The method analyzes information regarding the face of the person that has been detected to determine whether the person is wearing personal protection equipment. In an instance in which the person is determined to not be wearing personal protection equipment, the method suspends a response to the gesture made by the person. However, in an instance in which the person is determined to be wearing personal protection equipment, the method analyzes the gesture made by the person relative to the HMI and converts the gesture to a corresponding command to the system associated with the HMI.

20 Claims, 3 Drawing Sheets

(56) References Cited

U.S. PATENT DOCUMENTS

| | | | |
|---|---|---|---|
| 2020/0004939 A1* | 1/2020 | Streit | H04L 63/102 |
| 2021/0304537 A1* | 9/2021 | Reed | G06F 18/22 |
| 2022/0129667 A1 | 4/2022 | Afrasiabi et al. | |
| 2022/0176779 A1* | 6/2022 | Ghannam | G06V 10/143 |
| 2022/0177135 A1 | 6/2022 | Shetty et al. | |

* cited by examiner

HUMAN MACHINE INTERFACE AND ASSOCIATED METHOD OF INTERACTION

CROSS-REFERENCE TO RELATED APPLICATIONS

This application claims benefit of U.S. Provisional Application No. 63/125,146, filed Dec. 14, 2020, the entire contents of which are incorporated herein by reference.

TECHNOLOGICAL FIELD

In an example embodiment, a human machine interface, a method for interacting with a human machine interface and a computer program product configured to interact with a human machine interface are provided with the human machine interface and the associated method and computer program product being configured to determine whether a person attempting to interact with the human machine interface is wearing personal protection equipment prior to responding to a gesture made by the person.

BACKGROUND

Human machine interfaces (HMIs) are employed in a wide variety of different applications in order to receive user input and to correspondingly control a system with which the HMI is associated. For example, HMIs may be utilized in conjunction with a wide variety of industrial, commercial, manufacturing and transportation applications. For example, aircraft may include one or more HMIs to receive input from the pilot or other crew members and/or from passengers.

HMIs commonly include a user interface, such as a touch screen. In order to provide input via the HMI to control the system associated therewith, the user touches the user interface and the HMI converts the touch detected by the touchscreen to a corresponding input that is utilized to control the system with which the HMI is associated. This reliance upon a touch screen to receive user input may limit the input options available to the user, such as by limiting the input options to those that are capable of being presented at any one time upon the touch screen for selection by the user. Additionally, the requirement for a user to physically contact a touch screen in order to provide input via to the HMI may subject the person to a variety of health risks. For example, various particles, such as, those carrying germs or viruses, may be deposited upon the touch screen by transfer of particles from a prior user of the touchscreen, by particles that were previously airborne coming to rest upon the touch screen or the like. In order to reduce the risks to which a user of an HMI having a touch screen may be subjected, the touch screen may be repeatedly cleaned, although such cleaning increases the time required and expense associated with use of the HMI. Additionally, cleaning of the touch screen may damage the screen and/or reduce the accuracy or performance of the touch screen.

BRIEF SUMMARY

A human machine interface (HMI), a method of interacting with an HMI and a corresponding computer program product are provided in accordance with an example embodiment in order to facilitate user interaction with an HMI. In an example embodiment, the HMI, the method and the associated computer program product are configured to detect and act upon gestures as opposed to requiring a user to touch the user interface of an HMI. By relying upon gestures, the HMI may be configured to receive a large number of different types of inputs by the user so as to increase the flexibility and the level of detail with which the system associated with the HMI is controlled. Additionally, the HMI, method and computer program product of an example embodiment are configured to detect whether the user is wearing personal protection equipment when the user is attempting to interact with the HMI. As such, the HMI, method and associated computer program product of this example embodiment may condition any response by the HMI, including any system associated with the HMI, to the input being provided by a user who is wearing personal protection equipment, thereby decreasing the health risks associated with the use of the HMI by the users as well as by other subsequent users. Further, the HMI, method and computer program product of an example embodiment may facilitate contact tracing by logging information identifying the user of the HMI and whether the user was wearing personal protection equipment.

In an example embodiment, a method is provided for interacting with a human machine interface (HMI) of a system. The method includes detecting a face of a person attempting to interact with the HMI and detecting a gesture made by the person relative to the HMI. The method also includes analyzing information regarding the face of the person that has been detected to determine whether the person is wearing personal protection equipment, such as a face mask. In an instance in which the person is determined to not be wearing personal protection equipment, the method suspends a response to the gesture made by the person relative to the HMI. However, in an instance in which the person is determined to be wearing personal protection equipment, the method analyzes the gesture made by the person relative to the HMI and converts the gesture to a corresponding command to the system with which the HMI is associated.

In the instance in which the person was previously determined not to be wearing personal protection equipment, the method of an example embodiment also includes subsequently detecting the face of the person attempting to interact with the HMI and analyzing the information regarding the face of the person that has been subsequently detected to determine whether the person is now wearing personal protection equipment. In an instance in which the person is determined to now be wearing personal protection equipment based upon subsequent detection of the face of the person, the method of this example embodiment terminates suspension of the response to the gesture and analyzes the gesture made by the person relative to the HMI and converts the gesture to the corresponding command to the system with which the HMI is associated.

The method of an example embodiment analyzes information regarding the face of the person by estimating a point cloud representative of the face of the person to determine whether the person is wearing the personal protection equipment. In an example embodiment, the method detects the face of the person attempting to interact with the HMI and detects a gesture made by the person relative to the HMI by detecting the face of the person based upon the signals received from a first sensor and detects the gesture made by the person relative to the HMI based upon signals received from a second sensor, different than the first sensor. In this example embodiment, the first sensor may be a near infrared (NIR) sensor and the second sensor may be an electro-optical (EO) sensor. In an example embodiment, the method detects the face of the person attempting to interact with the HMI, analyzes information regarding the face of the person that has been detected to determine whether the person is wearing personal protection equipment, analyzes the gesture made by the person relative to the HMI and converts the gesture to the corresponding command utilizing one or more convolutional neural networks.

In another example embodiment, a human machine interface (HMI) of a system is provided that includes processing circuitry configured to detect a face of a person attempting to interact with the HMI and to detect a gesture made by the person relative to the HMI. The processing circuitry is also configured to analyze information regarding the face of the person that has been detected to determine whether the person is wearing personal protection equipment, such as a face mask. In an instance in which the person is determined not to be wearing personal protection equipment, the processing circuitry is configured to send a response to the gesture made by the person relative to the HMI. However, in an instance in which the person is determined to be wearing personal protection equipment, the processing circuitry is configured to analyze the gesture made by the person relative to the HMI and convert the gesture to a corresponding command to the system with which the HMI is associated.

In the instance in which the person was previously determined to not be wearing personal protection equipment, the processing circuitry of an example embodiment is further configured to subsequently detect the face of the person attempting to interact with the HMI and to analyze information regarding the face of the person that has been subsequently detected to determine whether the person is now wearing the personal protection equipment. In an instance in which the person is determined to now be wearing personal protection equipment based upon subsequent detection of the face of the person, the processing circuitry of this example embodiment is also configured to terminate suspension of the response to the gesture and to analyze the gesture made by the person relative to the HMI and convert the gesture to the corresponding command to the system with which the HMI is associated.

The processing circuitry of an example embodiment is configured to analyze information regarding the face of the person by estimating point cloud data representative of the face of the person to determine whether the person is wearing the personal protection equipment. The HMI of an example embodiment also includes a first sensor configured to provide signals to the processing circuitry from which the face of the person attempting to interact with the HMI is detected and a second sensor, different than the first sensor, configured to provide signals to the processing circuitry from which the gesture made by the person relative to the HMI is detected. The first sensor may be a near infrared (NIR) sensor and the second sensor may be an electro-optical (EO) sensor. In an example embodiment, the processing circuitry incudes one or more convolutional neural networks configured to detect the face of the person attempting to interact with the HMI, analyze information regarding the face of the person that has been detected to determine whether the person is wearing personal protection equipment, analyze the gesture made by the person relative to the HMI and convert the gesture to the corresponding command.

In a further example embodiment, a computer program product is provided that includes at least one non-transitory computer-readable storage medium having computer-executable program code instructions stored therein with the computer-executable program code instructions including program code instructions to detect a face of a person attempting to interact with the HMI and program code instructions to detect a gesture made by the person relative to the HMI. The computer-executable program code instructions also include program code instructions to analyze information regarding the face of the person that has been detected to determine whether the person is wearing personal protection equipment, such as a face mask. The computer-executable program code instructions further include program code instructions to suspend, in an instance in which the person is determined to not be wearing personal protection equipment, the response to the gesture made by the person relative to the HMI. Additionally, the computer-executable program code instructions include program code instructions to analyze the gesture made by the person relative to the HMI and program code instructions to convert the gesture to a corresponding command to the system with which the HMI is associated, in an instance in which the person is determined to be wearing personal protection equipment.

In the instance in which the person is previously determined to not be wearing personal protection equipment, the computer-executable program code instructions further include program code instructions to subsequently detect the face of the person attempting to interact with the HMI and program code instructions to analyze information regarding the face that has been subsequently detected to determine whether the person is now wearing the personal protection equipment. In an instance in which the person is determined now to be wearing personal protection equipment based upon subsequent detection of the face of the person, the computer-executable program code instructions of this example embodiment also include program code instructions to terminate suspension of the response to the gesture and program code instructions to analyze the gesture made by the person relative to the HMI and convert the gesture to the corresponding command to the system with which the HMI is associated.

The program code instructions to analyze information regarding the face of the person include, in one example embodiment, program code instructions to estimate point cloud data representative of the face of the person to determine whether the person is wearing personal protection equipment. In an example embodiment, the program code instructions to detect the face of the person attempting to interact with the HMI and the program instructions to detect the gesture made by the person relative to the HMI include program code instructions to detect the face of the person based upon signals received from a first sensor and program code instructions to detect the gesture made by the person relative to the HMI based upon signals received from a second sensor, different than the first sensor. The first sensor of this example embodiment may be a near infrared (NIR) sensor and the second sensor may be an electro-optical (EO) sensor. In an example embodiment, the program code instructions include one or more convolutional neural networks configured to detect the face of the person attempting to interact with the HMI, to analyze information regarding the face of the person that has been detected to determine whether the person is wearing personal protection equipment, to analyze the gesture made by the person relative to the HMI and to convert the gesture to the corresponding command.

BRIEF DESCRIPTIONS OF THE DRAWINGS

Having thus described certain example embodiments of the present disclosure in general terms, reference will here- inafter be made to the accompanying drawings, which are not necessarily drawn to scale, and wherein:

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A human machine interface (HMI), a method for interacting with the HMI and a computer program product configured to interact with the HMI are provided in accordance with an example embodiment. The HMI includes a user interface that receives user input that is detected and then converted to corresponding commands so as to direct the operation of a system with which the HMI is associated. The HMI may be associated with any of a wide range of systems and utilized in any of a wide range of different industries and applications. For example, the HMI may be utilized in conjunction with commercial systems, industrial systems, retail systems, manufacturing systems and systems utilized in the transportation industry.

Figure 1:
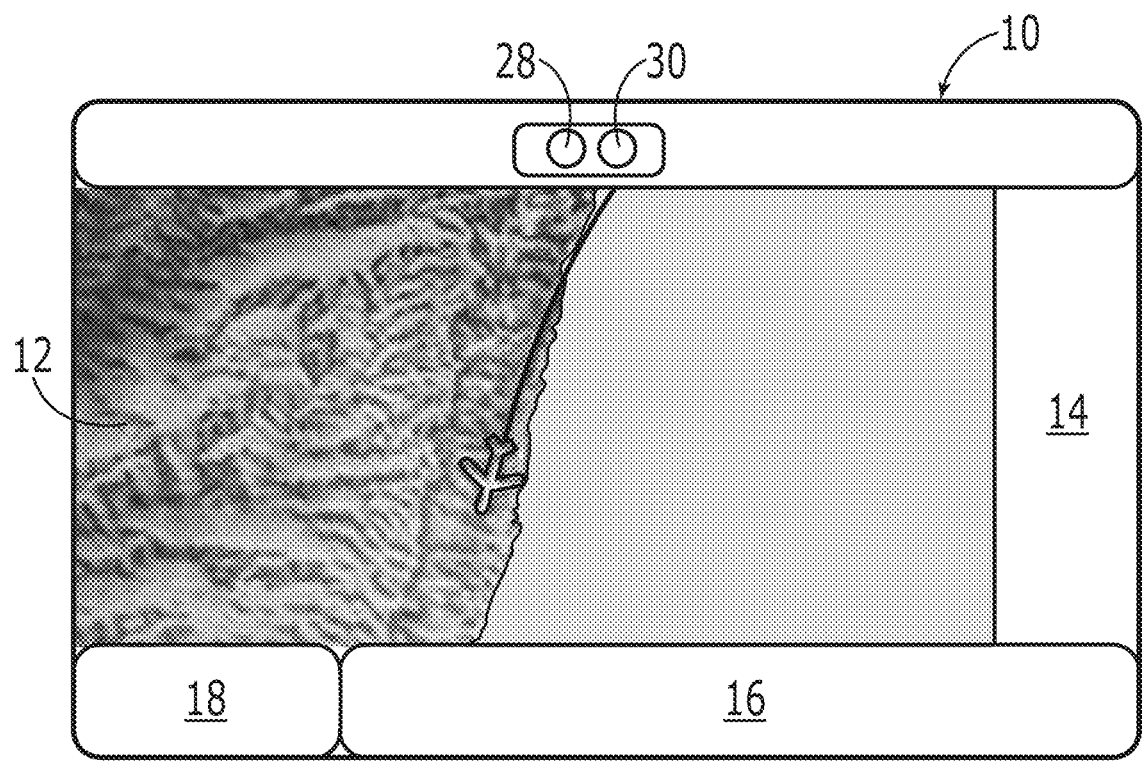
FIG. 1 illustrates an HMI configured to be responsive to gestures in accordance with an example embodiment.

By way of example, the user interface 10 of an HMI utilized in the transportation industry, and, more particularly, the user interface associated with an in-flight aircraft cabin display is depicted in FIG. 1 by way of example, but not of limitation. As shown in FIG. 1, the user interface includes a first region 12 in which informational content is presented, such as for viewing by a passenger onboard the aircraft. In the illustrated embodiment, a representation of the flight path of the aircraft relative to underlining terrain is depicted. However, the first region of the user interface may provide other types of information to the user in addition to or instead of the flight path information depicted by FIG. 1.

The user interface 10 of FIG. 1 also includes a plurality of other regions including a region 14 that provides a menu of functions that may be performed in response to user input. Additionally, the user interface of this example embodiment includes a region 16 that is configured to provide notifications to the user and/or to provide various guidelines to the user, such as instructions to a passenger to remain seated with their seatbelt buckled. The user interface of this example embodiment also includes a region 18 that provides information regarding personal protection equipment, such as a face mask, worn by the user. The user interface of FIG. 1 is provided by way of example of one type of user interface of an HMI that may be provided in accordance with an example embodiment, but the user interface of the HMI may be configured in a wide variety of other manners and need not include different regions or, if regions are included, may include any number or configuration of regions.

Figure 2:
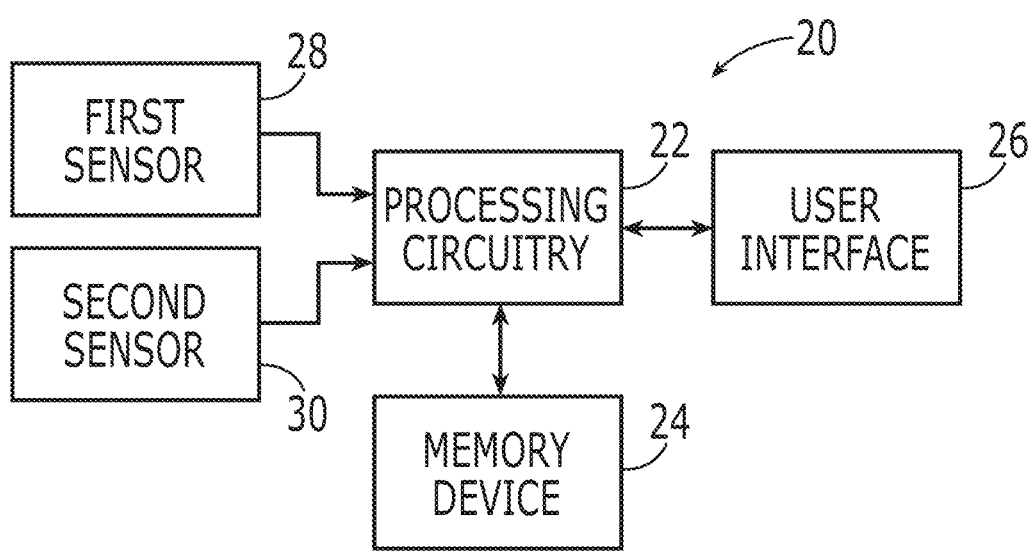
FIG. 2 is a block diagram of an HMI including processing circuitry that may be specifically configured in accordance with an example embodiment.

A block diagram of an HMI 20 in accordance with an example embodiment is depicted in FIG. 2. The HMI may be embodied by any of a variety of different computing devices, such as a server, a computer workstation, a network of a distributed computing devices, a personal computer, tablet computer, etc. Thus, the HMI does not require a specific hardware design, but any of a variety of computing devices may be configured to operate as described herein. Regardless of the type of computing device that embodies the HMI, however, the HMI of the illustrated embodiment includes, is associated with or is otherwise in communication with processing circuitry 22, memory device 24, a user interface 26 and one or more sensors.

The processing circuitry 22 may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. In some example embodiments, the processing circuitry is configured to execute instructions stored in the memory device 24 or otherwise accessible to the processing circuitry. These instructions, when executed by the processing circuitry, may cause the HMI 20 to perform one or more of the functionalities described herein. As such, the HMI may comprise an entity capable of performing operations according to embodiments of the present disclosure while configured accordingly. Thus, for example, when the processing circuitry is embodied as an ASIC, FPGA or the like, the processing circuitry and, correspondingly, the HMI may comprise specifically configured hardware for conducting one or more operations described herein. Alternatively, as another example, when the processing circuitry is embodied as an executor of instructions, such as may be stored in the memory device, the instructions may specifically configure the processing circuitry and, in turn, the computing device to perform one or more algorithms and operations described herein.

The memory device 24 may include, for example, non-volatile memory. The memory device may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof In this regard, the memory device may comprise any non-transitory computer readable storage medium. The memory device may be configured to store information, data, applications, instructions, or the like for enabling the HMI 20, such as the processing circuitry 22, to carry out various functions in accordance with example embodiments of the present disclosure. For example, the memory device may be configured to store program instructions for execution by the processing circuitry.

The user interface 26 may be in communication with the processing circuitry 22 and the memory device 24 to receive an indication of a user input, such as a gesture performed by a user, and/or to provide an audible, visual, mechanical, or other output to the user. As such, the user interface may include, for example, a display and one or more speakers for providing visual and audible output to a user.

Although the HMI 20 may include various sensors in order to detect the face of the user and gestures made by the user relative to the HMI, the HMI of an example embodiment includes a first sensor 28 and a second sensor 30. The first and second sensors are of different types. In one embodiment, the first sensor is a near infrared (NIR) sensor and the second sensor is an electro-optical (EO) sensor. In this regard, the user interface 10 of the HMI depicted in FIG. 1 also includes first and second sensors including an NIR sensor and an EO sensor, respectively. In some embodiments, the HMI may define a virtual privacy partition that limits the respective fields of view of the first and second sensors. In this regard, the first and second sensors are configured and/or the HMI is configured to analyze the signals provided by the first and second sensors such that the respective fields of view of the first and second sensors are limited in such a manner so as to detect the person interacting with the HMI, but not the person in an adjacent seat.

Figure 3:
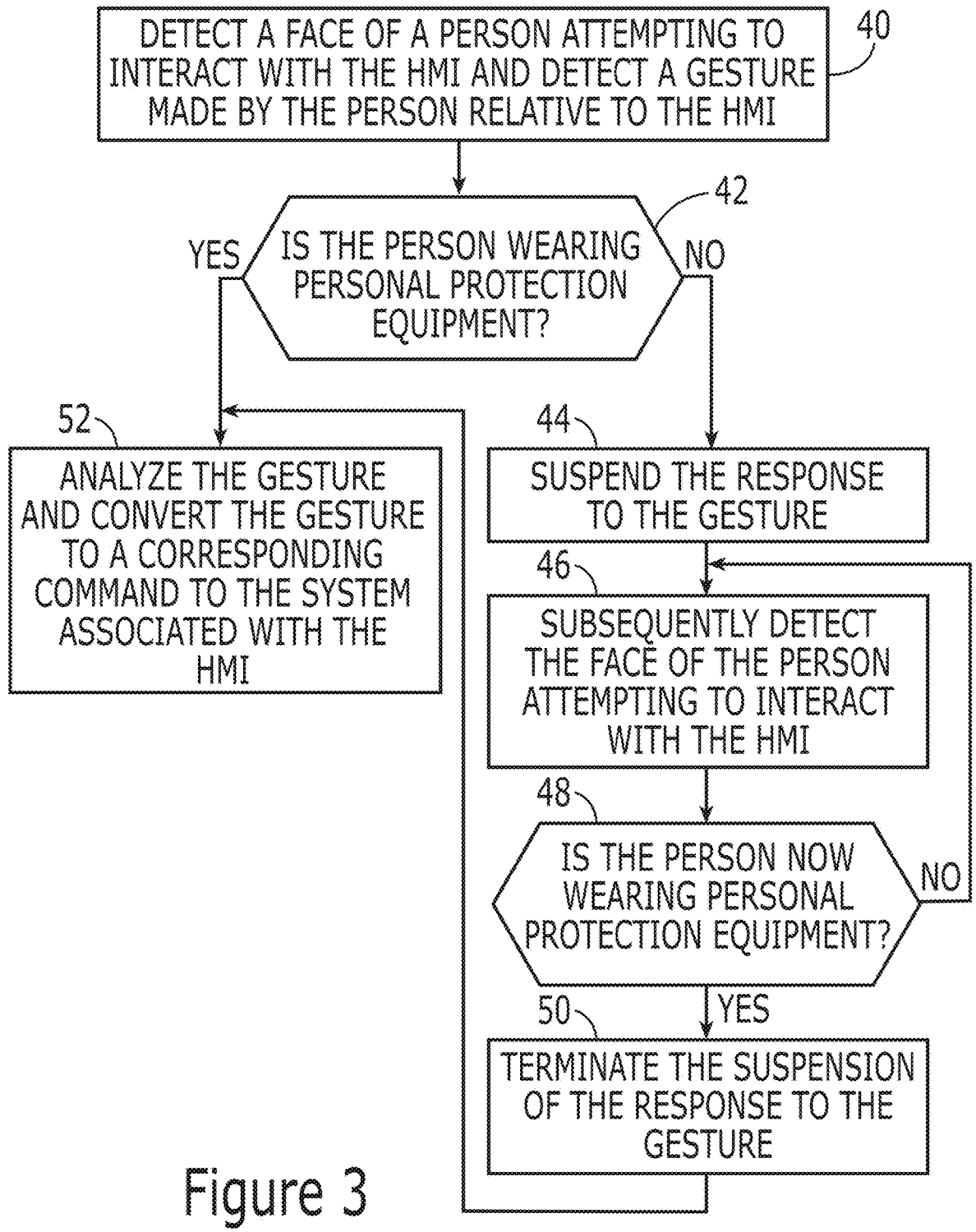
FIG. 3 is a flow chart illustrating operations performed, such as by the computing device of FIG. 2, in accordance with an example embodiment.

Referring now to FIG. 3, the operations performed, such as by the HMI 20 of FIG. 2, are depicted. Referring now to block 40 of FIG. 3, the HMI, such as the first sensor 28, e.g., an NIR sensor, is configured to detect the face of a person attempting to interact with the HMI. Additionally, the HMI, such as the second sensor 30, e.g., EO sensor, is configured to detect a gesture made by the person relative to the HMI. The detection of the face of the person attempting to interact with the HMI and the detection of the gesture made by the person relative to the HMI may be performed at the same time or within a predefined window of time to increase the likelihood that the person whose face is detected and who is attempting to interact with the HMI is the same person who performed the gesture relative to the HMI that was also detected.

In one embodiment, the first and second sensors 28, 30 of the HMI 20 may be configured to continuously monitor their respective regions of view to detect the presence of the face of a person attempting to interact therewith and one or more gestures performed by the person relative to the HMI. Alternatively, the HMI may be configured to be triggered, such as by detection of a predefined gesture, e.g., a wave, by the user, with the HMI thereafter beginning to monitor for the face of a person attempting to interact therewith and the provision of another gesture that is intended to direct the operation of the system with which the HMI is associated. In this example embodiment, the second sensor, such as the EO sensor, of the HMI may be continuously or repeatedly activated to detect a predefined trigger gesture. However, the first sensor, such as the NIR sensor, may remain inactive until the trigger gesture has been detected after which the first sensor is also activated in order to detect the face of the person who then makes the gesture to command the system with which the HMI is associated.

Gestures performed by a hand of the person interacting with the HMI 20 are discussed herein by way of example, but not of limitation. In some embodiments, the gesture may be performed by the person in a different manner, such as by performing gestures utilizing the head of the person, e.g., nodding, tilting the head to the right, left, forward, etc. For example, the person interacting with the HMI may indicate that they do not wish to utilize hand gestures or the person may have a disability that limits their ability to perform hand gestures such that the person then performs the gestures by movement or positioning of their head. Thus, reference herein to hand gestures that are detected and analyzed is equally applicable to gestures that are differently performed by the person, such as with the head of the person.

The HMI 20, such as the processing circuitry 22, is also configured to analyze information regarding the face of the person that has been detected, such as by the first sensor 28, in order to determine whether the person is wearing personal protection equipment. See block 42 of FIG. 3. The HMI, such as the processing circuitry, may be configured to determine whether the person is wearing any of a variety of different types of personal protection equipment including, for example, a face mask, a face shield or the like. In some embodiments, the type of personal protection equipment that is the subject of the analysis is dependent upon the role or job performed by the person. For example, in an instance in which the person is a surgeon, the personal protection equipment that is the subject to the analysis includes a head covering and a face mask. Alternatively, in an instance in which the person is a passenger onboard an aircraft, train or bus, the personal protection equipment that is the subject of the analysis may be a face mask with no requirement of a head covering.

The processing circuitry 22 may be configured to analyze the information regarding the face of the person to determine whether the person is wearing personal protection equipment in a variety of different manners. For example, the processing circuitry may be configured to perform one or more image analysis and/or image recognition techniques to detect whether or not the person is wearing personal protection equipment. As described below in relation to the analysis of the signals provided by the second sensor 30 to identify a gesture that has been performed, the processing circuitry of an example embodiment may include or embody one or more convolutional neural networks (CNNs) that have been trained to detect the face of a person and to determine if the person is wearing personal protection equipment, such as a face mask.

In another example embodiment, the first sensor 28, such as an NIR sensor, is configured to capture point cloud data representative of the face of the person attempting to interact with the HMI 20. In this example embodiment, the HMI, such as the processing circuitry 22, is configured to estimate the point cloud data that is representative of a face of the person, such as in real time, to determine whether the person is wearing personal protection equipment. The point cloud data provides the key points of the face in a three dimensional (3D) space from which eyes, ears, nose, mouth, chin and other distinctive features may be identified. Based on type of personal protection equipment that is worn, some of these key points would either not be detected, such as a user's mouth which is covered with a face mask, or have a low detection probability, such as in an instance in which the location of the mouth is estimated based on a standard distance of the mouth from other facial feature(s), thereby allowing a determination as to whether a person is wearing personal protection equipment.

In an instance in which the person is determined to not be wearing personal protection equipment, the HMI 20, such as the processing circuitry 22, is configured to suspend performance of the response to the gesture that was made by the person relative to the HMI and detected, such as by a second sensor 30. See block 44 of FIG. 3. By suspending the response to the gesture, the response is not performed and the HMI, such as the processing circuitry, waits until the person has donned the personal protection equipment prior to performing the response to the gesture that was detected. For example, in an instance in which the person was previously determined to not be wearing personal protection equipment, the HMI, such as the processing circuitry, of one embodiment is also configured to subsequently detect the face of a person attempting to interact with the HMI. See block 46. In this regard, the subsequent detection follows the prior detection of a person attempting to interact with the HMI, but who was not wearing personal protection equipment. In some embodiments, the HMI, such as the processing circuitry, is configured to require the subsequent detection of the face of a person attempting to interact with the HMI to occur within a predefined period of time relative to the prior detection of a person attempting to interact with the HMI. In an instance in which the subsequent detection of the face of a person attempting to interact with the HMI does not occur within the predefined period of time, the HMI, such as the processing circuitry, of this example embodiment is configured to not permit resumption of the suspended response to the prior gesture and, instead, the user must recommence the process once the user had donned the person protection equipment.

However, following the subsequent detection of the face of a person attempting to interact with the HMI, such as within the predefined period of time, the HMI 20, such as the processing circuitry 22, of an example embodiment is configured to determine whether the same person is attempting to interact with the HMI, such as based upon facial recognition or other comparisons between the detected representations of the face of the person. In an instance in which the face of a different person is subsequently detected, the HMI, such as the processing circuitry, of this example embodiment is configured to not permit resumption of the suspended response to the prior gesture and, instead, the user must recommence the process once the user had donned the person protection equipment. However, in an instance in which the HMI, such as the processing circuitry, determines that the same person is attempting to interact with the HMI, the HMI, such as the processing circuitry, is configured to analyze information regarding the face of the person that has been subsequently detected, such as by the first sensor 28, to determine whether the person is now wearing the personal protection equipment. See block 48. In an instance in which the person still has not donned the personal protection equipment, the HMI, such as the processing circuitry, is configured to continue to cause the response to the gesture previously made by the person relative to the HMI to be suspended.

In an instance in which the person is determined to now be wearing personal protection equipment based upon the subsequent detection of the face of the person, however, the HMI 20, such as the processing circuitry 22, is configured to terminate suspension of the response to the gesture. See block 50 of FIG. 3. Upon terminating the suspension of the response to the gesture and as described below, the HMI, such as the processing circuitry, is configured to analyze the gesture made by the person relative to the HMI and to convert the gesture to the corresponding command to system with which the HMI is associated. As such, the system is then directed to perform the function with which the gesture is associated. Although the gesture need not be analyzed and converted to a corresponding command to the system until the suspension of the response has been terminated in order to conserve or at least defer utilization of processing resources and time, the gesture may be analyzed and converted to a corresponding command prior to having terminated the suspension of the response so long as the system is not directed to and does not perform the function commanded by the gesture until the suspension has been terminated. For example, the gesture may be analyzed and converted to a corresponding command upon detection of the gesture and/or during the suspension of the response, but the system is not directed to and does not perform the function commanded by the gesture until the suspension has been terminated.

Referring back to block 42 of FIG. 3, in an instance in which the initial analysis of the information regarding the face of the person that has been detected determines that the person is wearing personal protection equipment, the HMI 20, such as the processing circuitry 22, is configured to analyze the gesture made by the person relative to the HMI and to convert the gesture to a corresponding command to the system with which the HMI is associated. See block 52 of FIG. 3. The system is then directed to perform the function with which the gesture is associated. The HMI, such as the processing circuitry, may be configured to analyze the gesture in various manners including performance of any of various image analysis and/or recognition techniques. In an example embodiment, however, the processing circuitry includes or embodies one or more convolutional neural networks that have been trained to recognize and distinguish respective gestures from a plurality of gestures to which the HMI and, in turn, the system associated with the HMI is responsive.

Although the convolutional neural network(s) may be configured to receive any of a variety of signals from the first and second sensors 28, 30 representative of the face of the person and the gesture performed by the person, respectively, which may optionally have been subjected to sensor data fusion, the processing circuitry 22 of an example embodiment includes or embodies one or more convolutional neural networks that receive several different versions of the information provided by the second sensor. In one example embodiment in which the second sensor provides three different signal streams representative of the gesture performed by the person in three different colors, such as red, green and blue, the convolutional neural network(s) may receive a first version of the information provided by the second sensor, namely, the three different signal streams and may be trained to identify a feature, such as a gesture, based thereupon.

In this example embodiment, the processing circuitry 22 may also be configured to receive a second version of the information provided by the second sensor in the form of signals representative of optical flow from the second sensor 30. In this regard, optical flow represents the pattern of motion of the hands of the person performing the gesture caused by relative motion between the hands of the person and the second sensor. Based upon the signals representative of optical flow, the processing circuitry is configured to identify a feature, e.g., a gesture, such as a result of the training of the one or more convolutional neural networks embodied by the processing circuitry to identify a gesture based upon the signals representative of optical flow. Further, the processing circuitry of this example embodiment may be configured to receive a third version of the information provided by the second sensor in the form of signals representative of the gesture performed by the person in three different colors via three different channels as well as signals representative of the pixels captured by the second sensor that have been subjected to semantic segmentation via a fourth channel. As a result of the semantic segmentation, the pixels that belong to the same object class have been clustered together. In an embodiment in which the processing circuitry includes or embodies one or more convolutional neural networks, the convolutional neural network(s) have also been trained to identify a feature, such as a gesture, based upon the signals representative of the three colors as well as the signals that have been subjected to semantic segmentation. In this example embodiment, the convolutional neural network(s) are further configured to process the features that have been identified based upon the three different versions of the information provided by the second sensor and to then predict the feature, such as the gesture, performed by the person relative to the HMI. This prediction may be performed in various manners including by utilization of support vector machine(s) and/or a softmax function.

After having analyzed the gesture as described above, the processing circuitry 22 may also be configured to convert the gesture to a corresponding command to this system with which the HMI 20 is associated. As such, the system may then perform the function corresponding to the gesture made by the person relative to the HMI.

With reference to the HMI 20 at FIG. 1 that depicts an in-flight aircraft cabin display, a passenger wearing a face mask may make a gesture relative to the user interface 10 of the HMI that instructs the HMI to change the content depicted in the first region 12 and to display information regarding the estimated time of arrival, the current airspeed, the time elapsed since departure etc. instead of the depiction of the flight path. The 'HMI of this example embodiment is configured to detect the face of the passenger based upon an analysis of the signals provided by the first sensor 28 to determine that the passenger is wearing personal protection equipment. As a result, the HMI of this example embodiment also analyzes the gesture that has been detected, such as by the second sensor 30, and converts the gesture to a command that causes the content depicted in the first region of the user interface to change to the desired content. However, in an instance in which the passenger makes the same gesture, but is not wearing a face mask or other personal protection equipment, the HMI determines that the passenger is not wearing personal protection equipment and suspends any response to the gesture, thereby continuing to present the flight path as shown in FIG. 1 and not altering the content presented in the first region of the display in the manner instructed pursuant to the gesture. In this instance, the HMI, such as the processing circuitry 22, may also be configured to provide information to the passenger regarding the suspension of any response to the gesture and may correspondingly provide information describing the personal protection equipment that must be worn by the passenger in order for the HMI to respond to the gesture performed by the passenger. This information may be depicted, for example, in region 18 of the user interface of FIG. 1.

In an example embodiment, the HMI 20 is configured to repeatedly detect the face of the person attempting to interact with the HMI, to determine whether the person is wearing personal protection equipment and, if not, to not only suspend consideration of a gesture performed by the person, but to provide a notification. For example, the HMI, such as the processing circuitry 22, may be configured to provide a notification to the person attempting to interact with the HMI in response to each of a predefined number of instances in which the person is detected not to be wearing personal protection equipment. In this example, the HMI, such as the processing circuitry, may also be configured to provide a system-level notification, such as by notifying the flight crew in an instance in which the HMI is onboard an aircraft, in an instance in which the person attempting to interact with the HMI continues to not wear personal protection equipment after having received the predefined number of personal notifications. The HMI may define the frequency with which the face of the person attempting to interact with the HMI is detected and analyzed to determine whether the person is wearing personal protection equipment in any of various manners, but, in one embodiment, the HMI determines whether the person is wearing personal protection equipment every 2 to 5 seconds, such as every 3 seconds.

Figure 4:
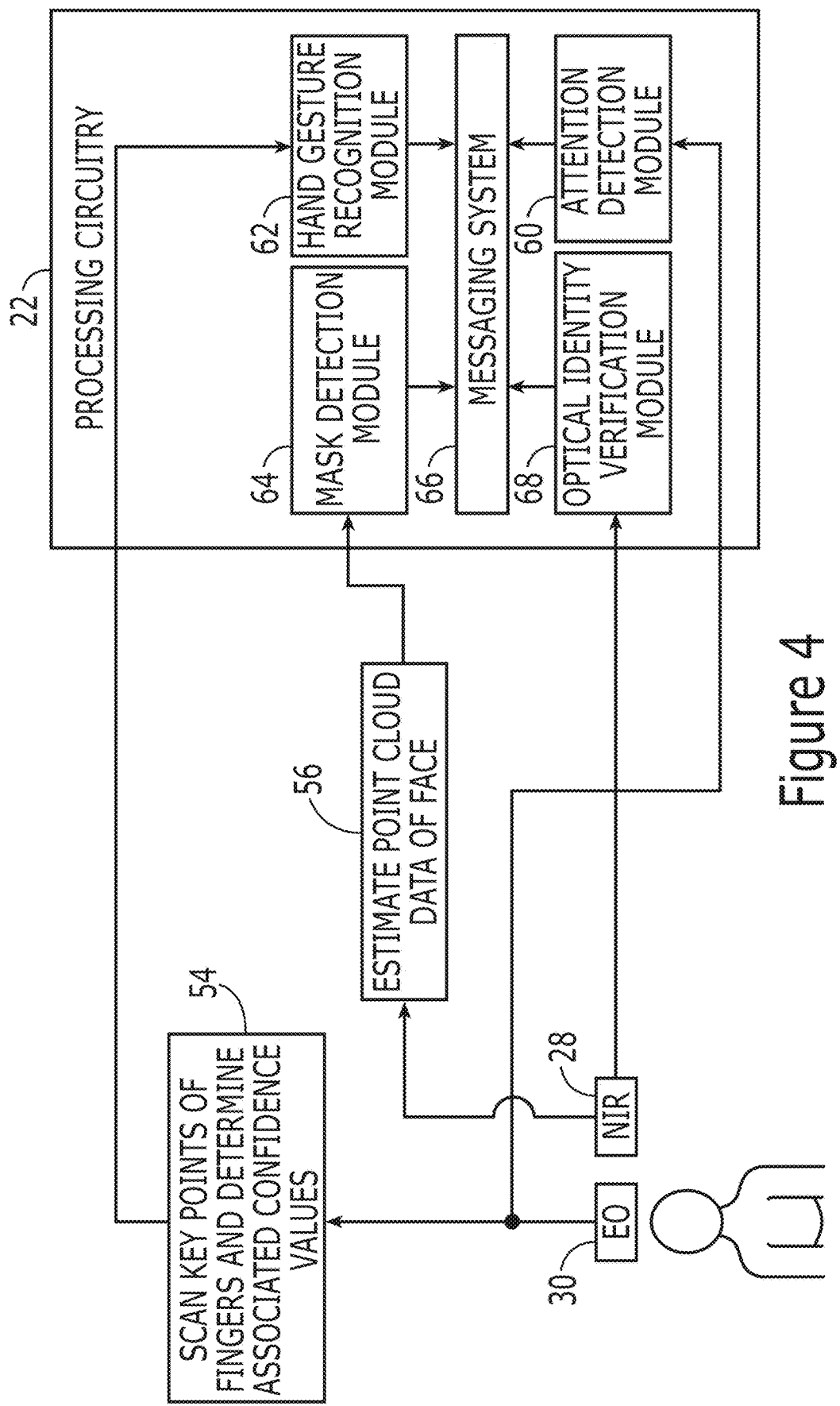
FIG. 4 is a flow diagram depicting interaction with an HMI in accordance with an example embodiment.

Referring now to FIG. 4, a flow diagram of the operations performed, such as by the processing circuitry 22 of the HMI 20, in accordance with an example embodiment of the present disclosure, is depicted. As shown, the second sensor 30, such as the EO sensor, is configured to provide signals indicative of the passenger and any gesture performed by the passenger that are within the field of view of the EO sensor. Although the EO sensor may provide any of a variety of different signals, the EO sensor of this example embodiment is configured to provide signals indicative of the coordinates of the fingers, such as coordinates of key points of the fingers, as well as the confidence values associated with those coordinates. See block 54 of FIG. 4. In this example embodiment, the EO sensor may initially provide the signal to the processing circuitry and, more particularly, to an attention detection module 60, such as implemented by one or more CNN's, embodied by the processing circuitry, to identify an instance in which the passenger is facing the user interface of the HMI and performs a predefined trigger gesture, such as by waving their hand. Once the trigger gesture has been detected, the signals detected by the EO sensor are provided to the processing circuitry and, more particularly, to a hand gesture recognition module 62 embodied, for example, by one or more convolutional neural networks. The hand gesture recognition module of this example embodiment is trained to recognize one or more gestures performed by the passenger.

In addition, the first sensor 28, such as an NIR sensor, is configured to provide signals in a form of point cloud data from which the processing circuitry 22 can estimate the face of the passenger. See block 56. This information may be provided to a mask detection module 64 embodied by the processing circuitry, such as by one or more convolutional neural networks. The mask detection module is configured to detect whether the passenger is wearing personal protection equipment. The processing circuitry of this example embodiment also includes a messaging system 66 configured to receive signals from the attention detection module 60, the hand gesture recognition module 62 and the mask detection module and to correspondingly communicate with the passenger, such as via the user interface 10, and/or the system with which the HMI 20 is associated. For example, in an instance in which the passenger is not wearing personal protection equipment, the messaging system of this example embodiment may be configured to provide information, such as via the user interface, alerting the passenger that the desired response to the gesture has been suspended pending the passenger putting on the personal protection equipment. However, if the passenger is determined to be wearing the personal protection equipment, the gesture that is recognized by the hand gesture recognition module is converted to a corresponding command and the system associated with the HMI is commanded by the messaging system to perform the function associated therewith.

In an example embodiment, the first sensor 28, such as an NIR sensor, may also be configured to scan a boarding pass or other indicia identifying the passenger. The processing circuitry 22, such as an optical identity verification system 68 of the embodiment of FIG. 4, is configured to verify that the passenger is to be sitting in the seat with which the HMI 20 is associated (such as by being placed in a seat back facing the respective seat). Although the processing circuitry may make such a determination in various manners, the processing circuitry, such as the optical identity verification system, of an example embodiment is configured to utilize natural language processing and optical character recognition to identify the passenger and the seat assigned to the passenger, such as identified by the boarding pass, and to verify whether the passenger is in the correct seat. In an instance in which the processing circuitry, such as the optical identity verification system, identifies that the patient is not in the correct seat, the processing circuitry, such as the messaging system 66, may be configured to provide a message, such as via the user interface 10, to the passenger alerting the passenger that they may be seated in the incorrect seat. Additionally, or alternatively, the processing circuitry, such as the messaging system, may be configured to notify the flight crew that the passenger may be seated in the incorrect seat. However, in an instance in which the processing circuitry, such as the optical identity verification system, determines that the passenger is seated in the correct seat and in which the processing circuitry, such as the attention detection module 60, determines that the trigger action has been performed, the processing circuitry, such as the hand gesture recognition module 62 and the mask detection module 64, may then process the signals provided by the EO sensor and the NIR sensor to determine whether the passenger is wearing personal protection equipment and, if so, to determine the gesture performed by the passenger. The processing circuitry, such as the messaging system, may then be configured to correspondingly command the system associated with the HMI to perform the function associated with the gesture.

As described, an HMI 20, a method of interacting with an HMI and a corresponding computer program product are provided in order to facilitate user interaction with an HMI. The HMI, the method and the associated computer program product are configured to detect and act upon gestures as opposed to requiring a user to touch the user interface of an HMI. By relying upon gestures, the HMI may be configured to receive a large number of different types of inputs by the user so as to increase the flexibility and the level of detail with which the system associated with the HMI is controlled. Additionally, the HMI, method and computer program product are configured to detect whether the user is wearing personal protection equipment when the user is attempting to interact with the HMI and may condition any response by the HMI, including any system associated with the HMI, to the input being provided by a user who is wearing personal protection equipment. Thus, the HMI, method and computer program product encourage user to wear personal protection equipment, thereby decreasing the health risks associated with the use of the HMI by the users as well as by other subsequent users. Further, the HMI, method and computer program product may be configured to log, that is, to maintain a record, of the of the user and whether the user wore personal protection equipment, thereby facilitating contact tracing relative to other users of the HMI or other people located nearby while the user interacted with the HMI.

As described above, FIGS. 3 and 4 illustrate flowcharts of an HMI 20, method, and computer program product according to example embodiments of the present disclosure. It will be understood that each block of the flowcharts, and combinations of blocks in the flowcharts, may be implemented by various means, such as hardware and/or a computer program product comprising one or more computer-readable storage mediums having computer readable program instructions stored thereon. For example, one or more of the procedures described herein may be embodied by computer program instructions of a computer program product. In this regard, the computer program product(s) which embody the procedures described herein may be stored by one or more memory devices 24 of an HMI and executed by a processing circuitry 22 of the HMI. In some embodiments, the computer program instructions comprising the computer program product(s) which embody the procedures described above may be stored by a plurality of memory devices. As will be appreciated, any such computer program product may be loaded onto a computer or other programmable apparatus to produce a machine, such that the computer program product including the instructions which execute on the computer or other programmable apparatus creates means for implementing the functions specified in the flowchart blocks. Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart blocks. The computer program instructions of one or more computer program products may also be loaded onto the computing system or other programmable apparatus to cause a series of operations to be performed on the computing system or other programmable apparatus to produce a computer-implemented process such that the instructions which execute on the computing system or other programmable apparatus implement the functions specified in the flowchart blocks.

Accordingly, blocks or steps of the flowcharts support combinations of means for performing the specified functions and combinations of steps for performing the specified functions. It will also be understood that one or more blocks of the flowcharts, and combinations of blocks in the flowcharts, may be implemented by special purpose hardware-based computer systems which perform the specified functions or steps, or combinations of special purpose hardware and computer program products.

The above described functions may be carried out in many ways. For example, any suitable means for carrying out each of the functions described above may be employed to carry out embodiments of the present disclosure. In one embodiment, a suitably configured computing system 20 may provide all or a portion of the elements of the present disclosure. In another embodiment, all or a portion of the elements may be configured by and operate under control of a computer program product. The computer program product for performing the methods of embodiments of the present disclosure includes a computer-readable storage medium, such as the non-volatile storage medium, and computer-readable program code portions, such as a series of computer instructions, embodied in the computer-readable storage medium.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A method for interacting with a human machine interface (HMI) of a system, the method comprising:
   detecting a face of a first person attempting to interact with the HMI and detecting a gesture made by the first person relative to the HMI;
   analyzing information regarding the face of the first person that has been detected to determine whether the first person is wearing personal protection equipment;
   in an instance in which the first person is determined to not be wearing personal protection equipment, suspending a response to the gesture made by the first person relative to the HMI;
   in an instance in which the first person is determined to be wearing personal protection equipment, analyzing the gesture made by the first person relative to the HMI and converting the gesture to a corresponding command to the system with which the HMI is associated;
   in an instance in which the response to the gesture made was suspended:
      subsequently detecting a subsequent face of a subsequent person attempting to interact with the HMI within a predetermined time period;
      analyzing information regarding the subsequent face of the subsequent person that has been subsequently detected to determine if it is the first person;
      analyzing information regarding the subsequent face of the subsequent person that has been subsequently detected to determine whether the subsequent person is now wearing the personal protection equipment; and
      in an instance in which the subsequent person is determined to be the first person and determined to now be wearing personal protection equipment based upon subsequent detection of the subsequent face of the subsequent person, terminating suspension of the response to the gesture and analyzing the gesture made by the first person relative to the HMI and converting the gesture to the corresponding command to the system with which the HMI is associated; and
      in an instance in which the subsequent person is determined to not be the first person, maintaining suspension of the response to the gesture.

2. A method according to claim 1 wherein the personal protection equipment comprises a face mask.

3. A method according to claim 1 wherein analyzing information regarding the face of the first person comprises estimating point cloud data representative of the face of the first person to determine whether the first person is wearing the personal protection equipment.

4. A method according to claim 1 wherein detecting the face of the first person attempting to interact with the HMI and detecting the gesture made by the first person relative to the HMI comprises detecting the face of the first person based upon signals received from a first sensor and detecting the gesture made by the first person relative to the HMI based upon signals received from a second sensor, different than the first sensor.

5. A method according to claim 4 wherein the first sensor comprises a near infrared (NIR) sensor and the second sensor comprises an electro-optic (EO) sensor.

6. A method according to claim 1 wherein detecting the face of the first person attempting to interact with the HMI, analyzing information regarding the face of the first person that has been detected to determine whether the first person is wearing personal protection equipment, analyzing the gesture made by the first person relative to the HMI and converting the gesture to the corresponding command are performed utilizing one or more convolutional neural networks.

7. A method according to claim 1, wherein the HMI is arranged in front of a seat, wherein detecting the face of the first person attempting to interact with the HMI further comprises verifying an identity of the first person as corresponding to the seat.

8. A human machine interface (HMI) of a system, the human machine interface comprising processing circuitry configured to:
   detect a face of a first person attempting to interact with the HMI and detect a gesture made by the first person relative to the HMI;
   analyze information regarding the face of the first person that has been detected to determine whether the first person is wearing personal protection equipment;
   in an instance in which the first person is determined to not be wearing personal protection equipment, suspend a response to the gesture made by the first person relative to the HMI; and
   in an instance in which the first person is determined to be wearing personal protection equipment, analyze the gesture made by the first person relative to the HMI and convert the gesture to a corresponding command to the system with which the HMI is associated;
   subsequently detect a subsequent face of a subsequent person attempting to interact with the HMI within a predetermined time period;
   analyze information regarding the subsequent face of the subsequent person that has been subsequently detected to determine if it is the first person;
   analyze information regarding the subsequent face of the subsequent person that has been subsequently detected to determine whether the subsequent person is now wearing the personal protection equipment; and
   in an instance in which the subsequent person is determined to be the first person and determined to now be wearing personal protection equipment based upon subsequent detection of the subsequent face of the subsequent person, terminate suspension of the response to the gesture and analyze the gesture made by the first person relative to the HMI and convert the gesture to the corresponding command to the system with which the HMI is associated; and
   in an instance in which the subsequent person is determined to not be the first person, maintain suspension of the response to the gesture.

9. A human machine interface according to claim 8 wherein the personal protection equipment comprises a face mask.

10. A human machine interface according to claim 8 wherein the processing circuitry is configured to analyze information regarding the face of the first person by estimating point cloud data representative of the face of the first person to determine whether the first person is wearing the personal protection equipment.

11. A human machine interface according to claim 8 further comprising:
   a first sensor configured to provide signals to the processing circuitry from which the face of the first person attempting to interact with the HMI is detected; and
   a second sensor, different than the first sensor, configured to provide signals to the processing circuitry from which the gesture made by the first person relative to the HMI is detected.

12. A human machine interface according to claim 11 wherein the first sensor comprises a near infrared (NIR) sensor and the second sensor comprises an electro-optic (EO) sensor.

13. A human machine interface according to claim 8 wherein the processing circuitry comprises one or more convolutional neural networks configured to detect the face of the first person attempting to interact with the HMI, analyze information regarding the face of the first person that has been detected to determine whether the first person is wearing personal protection equipment, analyze the gesture made by the first person relative to the HMI and convert the gesture to the corresponding command.

14. A human machine interface according to claim 8, wherein the HMI is arranged in front of a seat, wherein the processing circuitry configured to detect the face of the first person attempting to interact with the HMI further comprises processing circuitry configured to verify an identity of the first person as corresponding to the seat.

15. A computer program product comprising at least one non-transitory computer-readable storage medium having computer-executable program code instructions stored therein, the computer-executable program code instructions comprising program code instructions to:
  detect a face of a first person attempting to interact with the HMI and detect a gesture made by the first person relative to the HMI;
  analyze information regarding the face of the first person that has been detected to determine whether the first person is wearing personal protection equipment;
  in an instance in which the first person is determined to not be wearing personal protection equipment, suspend a response to the gesture made by the first person relative to the HMI; and
  in an instance in which the first person is determined to be wearing personal protection equipment, analyze the gesture made by the first person relative to the HMI and convert the gesture to a corresponding command to the system with which the HMI is associated;
  subsequently detect a subsequent face of a subsequent person attempting to interact with the HMI within a predetermined time period;
  analyze information regarding the subsequent face of the subsequent person that has been subsequently detected to determine if it is the first person;
  analyze information regarding the subsequent face of the subsequent person that has been subsequently detected to determine whether the subsequent person is now wearing the personal protection equipment; and
  in an instance in which the subsequent person is determined to be the first person and determined to now be wearing personal protection equipment based upon subsequent detection of the subsequent face of the subsequent person, terminate suspension of the response to the gesture and analyze the gesture made by the first person relative to the HMI and convert the gesture to the corresponding command to the system with which the HMI is associated; and
  in an instance in which the subsequent person is determined to not be the first person, maintain suspension of the response to the gesture.

16. A computer program product according to claim 15 wherein the personal protection equipment comprises a face mask.

17. A computer program product according to claim 15 wherein the program code instructions to analyze information regarding the face of the first person comprise program code instructions to estimate point cloud data representative of the face of the first person to determine whether the first person is wearing the personal protection equipment.

18. A computer program product according to claim 15 wherein the program code instructions to detect the face of the first person attempting to interact with the HMI and detect the gesture made by the first person relative to the HMI comprise program code instructions to detect the face of the first person based upon signals received from a first sensor and detect the gesture made by the first person relative to the HMI based upon signals received from a second sensor, different than the first sensor.

19. A computer program product according to claim 15 wherein the program code instructions comprise one or more convolutional neural networks configured to detect the face of the first person attempting to interact with the HMI analyze information regarding the face of the first person that has been detected to determine whether the first person is wearing personal protection equipment, analyze the gesture made by the first person relative to the HMI and convert the gesture to the corresponding command.

20. A computer program product according to claim 15, wherein the HMI is arranged in front of a seat, wherein the program code instructions to detect the face of the first person attempting to interact with the HMI further comprise program code instructions to verify an identity of the first person as corresponding to the seat.

* * * * *